(12) United States Patent
Reine et al.

(10) Patent No.: US 12,334,856 B2
(45) Date of Patent: Jun. 17, 2025

(54) LINEAR ACTUATOR AND HEATING METHOD

(71) Applicant: Ewellix AB, Gothenburg (SE)

(72) Inventors: Larsson Reine, Gothenburg (SE); DagArne Rörvik, Gothenburg (SE)

(73) Assignee: Ewellix AB, Gothenburg (SE)

( * ) Notice: Subject to any disclaimer, the term of this patent is extended or adjusted under 35 U.S.C. 154(b) by 120 days.

(21) Appl. No.: 18/313,498

(22) Filed: May 8, 2023

(65) Prior Publication Data

US 2023/0361712 A1    Nov. 9, 2023

(30) Foreign Application Priority Data

May 6, 2022   (DE) .................... 10 2022 111 389.2

(51) Int. Cl.
| | |
|---|---|
| *G05B 5/00* | (2006.01) |
| *G05D 23/00* | (2006.01) |
| *H02H 7/08* | (2006.01) |
| *H02K 11/25* | (2016.01) |
| *H02K 11/33* | (2016.01) |
| *H02K 41/02* | (2006.01) |
| *H02P 29/62* | (2016.01) |

(52) U.S. Cl.
CPC ............ *H02P 29/62* (2016.02); *H02K 11/25* (2016.01); *H02K 11/33* (2016.01); *H02K 41/02* (2013.01)

(58) Field of Classification Search
CPC ......... H02P 29/62; H02K 11/25; H02K 11/33; H02K 41/02
USPC ........................................................ 318/473
See application file for complete search history.

(56) References Cited

U.S. PATENT DOCUMENTS

| | | | |
|---|---|---|---|
| 5,708,336 A | 1/1998 | Eyerly et al. | |
| 2010/0025946 A1* | 2/2010 | Inoue | B60G 15/08 280/6.157 |
| 2010/0156338 A1 | 6/2010 | Lu et al. | |
| 2012/0293102 A1 | 11/2012 | Kock et al. | |
| 2015/0277426 A1* | 10/2015 | Ogata | B25J 9/1694 901/46 |
| 2023/0016098 A1* | 1/2023 | Jayaraj | H05K 7/20836 |

FOREIGN PATENT DOCUMENTS

DE    102020107757 A1    9/2021

* cited by examiner

*Primary Examiner* — Erick D Glass
(74) *Attorney, Agent, or Firm* — Laurence A. Greenberg; Werner H. Stemer; Ralph E. Locher

(57) ABSTRACT

A linear actuator and a method for heating a linear actuator. An electric motor is configured to generate rotational motion in a first operating mode of the linear actuator. A transmission mechanism is configured to convert the rotational motion generated by the electric motor into translational motion. The linear actuator is further configured to generate heat in a second operating mode.

17 Claims, 2 Drawing Sheets

LINEAR ACTUATOR AND HEATING METHOD

CROSS-REFERENCE TO RELATED APPLICATION

This application claims the priority, under 35 U.S.C. § 119, of German Patent Application DE 10 2022 111 389.2, filed May 6, 2022; the prior application is herewith incorporated by reference in its entirety.

FIELD AND BACKGROUND OF THE INVENTION

The present invention relates to a linear actuator and a method for heating a linear actuator.

In order to translate objects, such as, for example machine parts, it is known to utilize linear actuators which comprise an electric motor and a transmission mechanism, for example, a nut cooperating with a screw. Sometimes, these linear actuators have to operate in extreme environmental conditions, for example, at very high or very low temperatures, respectively. In order to enable this operation, a dedicated heating or cooling device may be provided. By means of such devices, actuators may be actively cooled or heated actively.

SUMMARY OF THE INVENTION

It is an object of the present invention to improve the heating of an electric actuator, in particular to simplify the heating of an electric actuator.

With the above and other objects in view there is provided, in accordance with the invention, a linear actuator, comprising:
 an electric motor configured to generate rotational motion in a first operating mode of the linear actuator;
 a transmission mechanism configured to convert the rotational motion generated by the electric motor into translational motion; and
 wherein the linear actuator is configured to generate heat in a second operating mode without the electric motor generating the rotational motion.

A linear actuator according to a first aspect of the invention comprises (i) an electric motor configured to generate rotational motion in a first operating mode of the linear actuator, and (ii) a transmission mechanism configured to convert the rotational motion generated by the electric motor into translational motion. According to the invention, the linear actuator is configured to generate heat in a second operating mode without the motor generating rotational motion.

In the sense of the present invention, the generation of heat is preferably an active generation of heat, i.e., an active act. For example, to generate heat, component parts of the linear actuator may be operated exclusively for the purpose of generating heat. Generation of heat does particularly not correspond to the inevitable generation of heat that is due, for example, to friction or electrical resistance, namely, heating that occurs during the conventional operation of a linear actuator.

An aspect of the invention is based on the approach to provide a linear actuator which is operable in two distinct operating modes. In a first operating mode, the linear actuator may be configured to operate conventionally, i.e., to convert rotational motion generated by an electric motor into translational motion by means of a transmission mechanism. In a second operating mode different from the first operating mode, in particular when the linear actuator does not convert rotational motion into translational motion, the linear actuator may be configured to generate heat. Therein, in the first operating mode, the linear actuator is preferably not actively heated, i.e., heat is only generated due to conventional operation of the motor and the transmission mechanism, for example due to friction of moving parts or electrical resistance. In the second operating mode, however, the linear actuator is preferably actively heated, i.e., component parts of the linear actuator may be operated such that they do not generate motion but only heat. By this means, no dedicated heating device, i.e., no additional component parts, is necessary for allowing a temperature control of the linear actuator. The linear actuator according to the invention may thus be more compact and/or produced particularly cost-efficient compared to conventional actuators with heating devices.

For example, the linear actuator may comprise component parts which are operable either in a first (conventional) manner in order to generate rotational motion and/or to transform rotational motion into linear motion or in a second (non-conventional) manner in order to generate heat. In other words, component parts of the linear actuator are preferably configured to change their operating behaviour between the first or second operating mode. By this means the heat may be generated from within the linear actuator. It is therefore particularly possible to operate the linear actuator at very low temperatures, e.g. below 0° C., preferably below −20° C., in particular below −40° C. even without a dedicated heating device.

In the following, preferred embodiments of the invention and their modifications will be described, which may be combined with each other as well as with further aspects of the invention as far as it is not explicitly excluded.

In a preferred embodiment, the electric motor is configured to generate the heat, in particular resistive heat, in the second operating mode. In particular, the linear actuator is configured to control the electric motor in the second operating mode such that heat, in particular resistive heat, is actively generated by the electric motor. In other words, the electric motor is configured to act as an active heat source in the second operating mode. By using the electric motor in this manner, the heat may be generated within the linear actuator by its functional component parts, in particular without the need to provide dedicated component parts as e.g. heating elements.

While actively generating the heat in the second operating mode, the electric motor is preferably not generating rotational motion. Instead, in the second operating mode, an electric current preferably runs through electrical wire of the electrical motor, in particular through at least one electromagnetic coil of the electric motor, in order to generate the heat. By this means, the motor parts of the electric motor may be used in a particularly efficient and/or versatile manner.

Here, the term "not generating rotational motion" is to be understood that the mechanical components of the motor substantially remain at a standstill, despite current flowing through wire of the motor. In other words, in the second operating mode, the motor may be supplied with a substantial amount of current, but the transmission mechanism is substantially not actuated, in particular without a rotor of the motor rotating substantially relative to a stator of the motor.

A particularly efficient and/or versatile use of the motor parts is for example possible with a brushless DC motor (BLDC motor). In a BLDC motor, electromagnetic coils of either a rotor or a stator may be supplied with a voltage in a manner without inducing motion of the rotor relative to the stator. Accordingly, the electric motor is preferably configured as a brushless DC motor.

In another preferred embodiment, in the second operating mode, the linear actuator is configured to generate the heat until a temperature of the linear actuator reaches or exceeds a first predetermined temperature threshold at least partially, in particular if the temperature of at least a portion of the linear actuator reaches or exceeds the threshold. That means that preferably at least one component part of the linear actuator, for example the electric motor, is operated in the second operating mode as long as a portion of the linear actuator, in particular the environment of the electric motor, does not overheat. By this means, the linear actuator may be brought to its operation temperature before conventional operation in the first operating mode. This allows prolonging the working life of the linear actuator and/or smooth operation.

The predetermined temperature threshold preferably corresponds to at least 0° C., for example at least 5° C., in particular at least 10° C. Above this temperature, the mechanical properties of component parts of the linear actuator may allow for reliable operation.

In yet another preferred embodiment, the linear actuator is configured to switch from the second operating mode to the first operating mode if a temperature of the linear actuator reaches or exceeds a second predetermined temperature threshold, in particular if the temperature of at least a portion of the linear actuator reaches or exceeds the threshold. In other words, the linear actuator is preferably configured to automatically start working conventionally once sufficient heat has been generated. By this means, efficient use of the linear actuator may be secured.

In yet another preferred embodiment, the first and/or second predetermined temperature threshold corresponds to a working temperature of the linear actuator. Preferably, the predetermined temperature threshold may correspond to at least 25° C., for example at least 35° C., in particular at least 45° C. By this means, it is possible to prevent component parts of the linear actuator from being exposed to temperature changes during operation of the linear actuator in the first operating mode. This may prolong the working life of the linear actuator and/or secure particular smooth and reliable operation.

In yet another preferred embodiment, the linear actuator comprises a control unit configured to control the electric motor in the second operating mode such that the electric motor generates the heat. For example, the linear actuator may comprise a printed circuit board (PCB), in particular an integrated circuit (IC), configured to control the electric motor to either generate rotational motion in the first operating mode or to actively generate heat, in particular resistive heat, in the second operating mode. Therein, in the second operating mode, the control unit preferably secures that the electric motor is not generating rotational motion, i.e., that no motor parts of the electric motor move relative to each other. Therefore, by means of the control unit, the linear actuator may be controlled in a particular simple manner.

In yet another embodiment, the control unit is configured to (i) determine a voltage of an energy storage unit connected to the linear actuator, to (ii) test whether the determined voltage lies within a predetermined voltage range, and to (iii) control the electric motor in the second operating mode based on a result of the test. By this means, an unwanted draining of the energy storage unit may be prevented.

For example, the control unit may monitor the output voltage of a battery assembly for powering the linear actuator. If the output voltage drops below a lower boundary of the predetermined voltage range, the control unit can stop generating the heat. This can assure sufficient remaining energy in the battery assembly for conventional operation of the linear actuator in the first operating mode, in particular for an emergency operation of the linear actuator.

In yet another preferred embodiment, the electric motor comprises a stator and a rotor mounted rotatably relative to the stator. Preferably, the linear actuator further comprises a control unit configured to direct an electric current through the windings of at least one electromagnetic coil of the stator or the rotor such that the rotor does not rotate relative to the stator in the second operating mode. For example, the control unit may be configured to direct a non-transient electric current through the windings of the at least one electromagnetic coil of the stator or the rotor such that a constant magnetic field is generated. This field may interact with the respective other motor part, in particular with a magnetic moment of the respective other of the stator or the rotor, respectively. For example, the magnetic field generated by means of a coil of the rotor may interact with a magnetic moment of the stator, or vice versa, thereby fixing the position of the rotor relative to the stator. The energy consumed by the resistance of the windings may effectively heat the electrical motor and its environment, in particular the whole linear actuator.

In yet another preferred embodiment, the control unit is configured to simultaneously direct the electric current through the windings of a plurality of electromagnetic coils of the stator or the rotor in the second operating mode, in particular through the windings of at least a subset of the electromagnetic coils of the stator or the rotor, preferably through the windings of all electromagnetic coils of the stator or rotor. By this means, the generation of a rotating magnetic field for inducing the rotational motion of the electric motor, in particular the rotor, may be prevented in a particular effective and reliable manner. For example, it becomes possible to reduce an initial rotational motion of the rotor relative to the stator, induced by an initial alignment of the electromagnetic coils and magnetic moments of rotor or the stator, respectively, to a minimum. In particular, by directing the electric current through the windings of a plurality of electromagnetic coils, circumferentially acting magnetic forces generated thereby may substantially counteract each other, resulting in a substantially vanishing net force acting on the rotor. As the electric current is directed through the windings of multiple electromagnetic coils, the heating of the linear actuator may be accelerated.

In yet another preferred embodiment, the linear actuator comprises a housing configured to encase the electric motor and the transmission mechanism. Preferably, the housing comprises a heat conducting material and is thermoconductively coupled to the electric motor. For example, the electric motor may be arranged inside the housing such that it directly contacts, i.e., touches, the housing. By this means, heat generated by the electric motor in the second operating mode may be efficiently conducted by the housing to other component parts of the linear actuator, for example to the transmission mechanism.

In yet another preferred embodiment, the electric motor and the transmission mechanism are successively arranged along a longitudinal axis of the linear actuator. In other words, the electric motor and the transmission mechanism are preferably arranged in line. It is particularly preferred when the electric motor and the transmission mechanism, in particular a nut and/or a screw of the transmission mechanism, are arranged coaxially. By this means, heat generated by the electric motor in the second operating mode can be easily, in particular directly, transferred to the transmission mechanism, in particular component parts thereof. In particular, it is not necessary to provide a gear unit for transmitting the rotational motion generated by the electric motor to the transmission mechanism, for example in form of a drive belt or gear pinions, which would reduce the efficiency of conducting the heat generated by the electric motor in the second operating mode throughout the linear actuator, in particular to the transmission mechanism.

In yet another preferred embodiment, the linear actuator comprises at least one temperature sensor configured to (i) detect a temperature of the linear actuator or at least of a portion of the linear actuator, respectively, and to (ii) generate corresponding sensor data. In order to allow for particularly precise and/or reliable control of the linear actuator, the sensor data may be used, for instance, to output a temperature signal to a user to regulate the heating in the second operating mode.

In yet another preferred embodiment, the linear actuator is configured to generate the heat in the second operating mode based on the sensor data generated by the at least one temperature sensor. Preferably, the control unit is configured to control the electric motor based on the sensor data in the second operating mode. For example, the linear actuator, in particular the control unit, may be configured to test whether the detected temperature exceeds the first and/or second predetermined temperature threshold based on the sensor data. Preferably, based on a result of the test, the linear actuator, in particular the control unit, is configured to alter the amount of heat generated, for example by increasing or reducing the power applied to the electric motor. By this means, the heating of the linear actuator may be adapted to the circumstances, for example be accelerated or decelerated.

Alternatively or additionally, based on a result of the test, the linear actuator, in particular the control unit, may be configured to switch from the second operating mode to the first operating mode. By this means, overheating of the linear actuator or at least component parts thereof and/or wasting energy may be prevented.

In yet another preferred embodiment, the at least one temperature sensor is arranged adjacent to the electric motor. For example, the at least one temperature sensor may be arranged radially adjacent to the rotor of the electric motor or axially adjacent to the stator. It is particularly preferable if the at least one temperature sensor is arranged inside the electric motor, in particular inside the stator and/or the rotor. In other words, the at least one temperature sensor may be integrated in the electric motor. This allows for detection of the temperature at its source. This allows for a particular reliable monitoring of the temperature.

According to a second aspect of the invention, in a method for heating a linear actuator, in particular a linear actuator according to the first aspect of the invention, a rotational motion is generated by means of an electric motor and transformed into translational motion by means of a transmission mechanism in a first operating mode of the linear actuator. According to the invention, the linear actuator is controlled such that it generates heat in a second operating mode without the electric motor generating rotational motion.

The described features and advantages described with respect to the first aspect of the invention and its preferred embodiments are, if not explicitly stated otherwise and at least where technically meaningful, valid also for the second aspect of the invention and its preferred embodiments and vice versa.

Further features which are considered as characteristic for the invention are set forth in the appended claims.

Also, further features, advantages and possible applications of the invention will become apparent from the following description in conjunction with the figures, in which the same reference numerals for the same or corresponding elements of the invention are used throughout.

Although the invention is illustrated and described herein as embodied in a linear actuator and heating method, it is nevertheless not intended to be limited to the details shown, since various modifications and structural changes may be made therein without departing from the spirit of the invention and within the scope and range of equivalents of the claims.

DETAILED DESCRIPTION OF THE INVENTION

Figure 1:
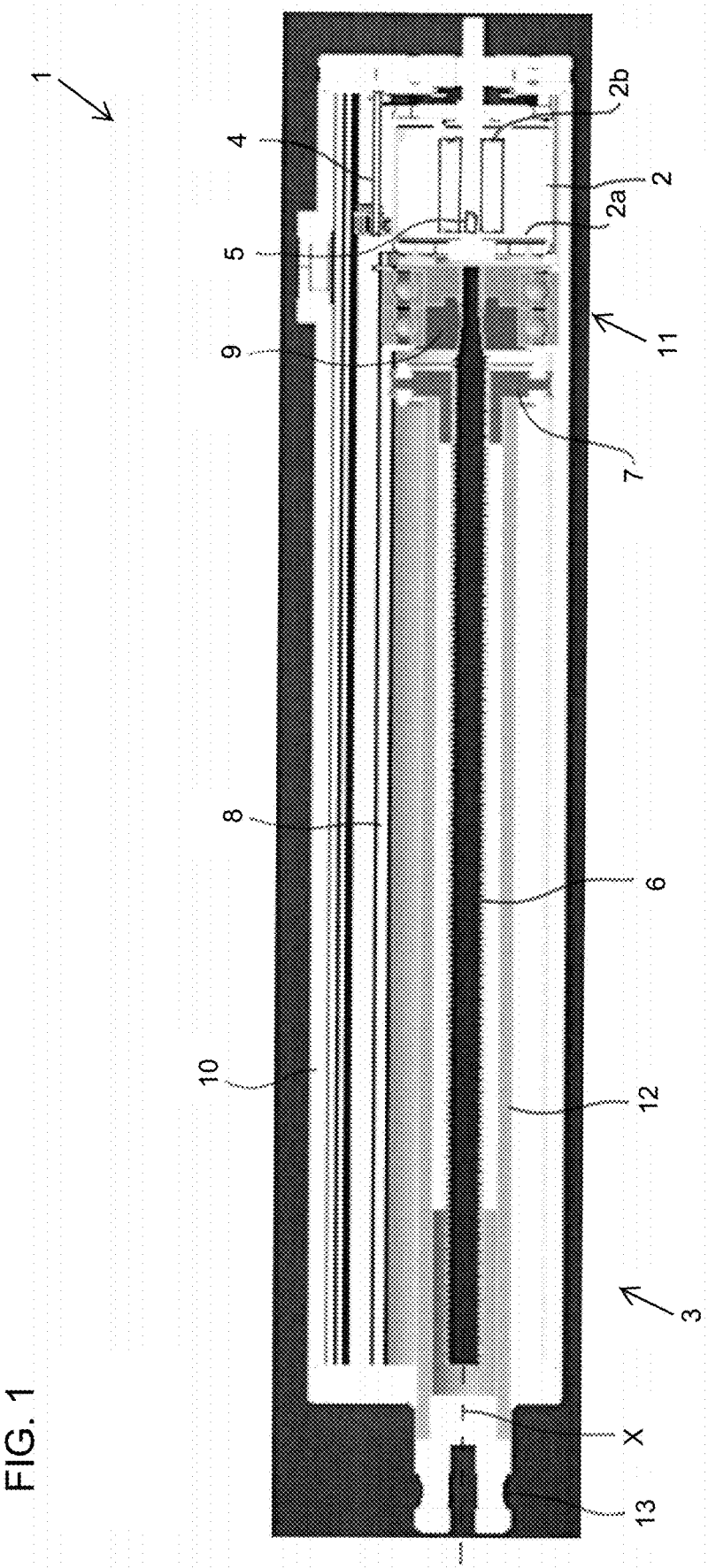
FIG. 1 is an elevation view of an exemplary linear actuator configured to generate heat in a second operating mode.

Referring now to the figures of the drawing in detail and first, in particular, to FIG. 1 thereof, there is shown an example of a linear actuator 1 configured to generate heat in a second operating mode of the linear actuator 1. The linear actuator 1 advantageously comprises an electric motor 2 configured to generate rotational motion in a first operating mode of the linear actuator 1, and a transmission mechanism 3 to convert the rotational motion generated by the electric motor 2 into translational motion.

The linear actuator 1 preferably further comprises a control unit 4 configured to control the electric motor 2. In particular, the control unit 4 may be configured to operate the electric motor 2 in the first operating mode such that it generates rotational motion, and to operate the electric motor 2 in the second operating mode such that it generates heat, in particular without simultaneously generating rotational motion.

To this end, in the second operating mode, the control unit 4, which may be a printed circuit board (PCB), in particular an integrated circuit (IC), may for instance be configured to apply an electrical voltage to at least one electromagnetic coil, preferably a plurality of electromagnetic coils, of a rotor 2a or a stator 2b of the electric motor 2, thereby generating an electric current flowing through the windings of the at least one coil. Preferably, the voltage or current, respectively, is non-transient such that a constant magnetic field is generated by the at least one electromagnetic coil. Depending on whether the at least one coil corresponds to the rotor 2a or the stator 2b, the generated magnetic field may interact with a magnetic moment of the respective other motor part, i.e., with the respective other of the stator 2b or the rotor 2a, respectively, such that a magnetic force holds the rotor 2a in its current position relative to the stator 2b. The resistance of the windings of the at least one electromagnetic coil leads to the generation of heat. The heat may, for instance, be used to pre-heat the linear actuator 1 before conventional operation of the linear actuator 1 in the first operating mode.

In order to ascertain that the linear actuator 1, in particular the electric motor 2, starts operating in the first operating mode substantially at a temperature above a temperature threshold, in particular within a predetermined temperature range, the linear actuator 1 further may comprise a temperature sensor 5. The temperature sensor 5 is preferably configured to detect the temperature of the linear actuator 1 and to generate corresponding sensor data which may, for example, be processed by the control unit 4.

In the present example shown in FIG. 1, the temperature sensor 5 is integrally formed with, or integrated in, the electric motor 2, in particular with the stator 2b. By this means, the temperature may be monitored directly at its source.

The control unit 4 may be configured to control the magnitude of the electric current directed through the windings of the at least one electromagnetic coil of the rotor 2a or the stator 2b based on the sensor data, i.e., the detected temperature of the linear actuator 1. In particular, the control unit 4 is preferably configured to control the magnitude of the electric current based on a difference between the detected temperature and a predetermined temperature, for example the predetermined temperature threshold.

For instance, if the detected temperature reaches or exceeds a first predetermined temperature threshold, the control unit 4 may reduce the electric current in order to reduce the generated heat, i.e., to decelerate the rise in temperature of the linear actuator 1. If the detected temperature then reaches or exceeds a second predetermined temperature threshold, which may for example correspond to a preferred operating temperature, the control unit 4 may switch the linear actuator 1 from the second operating mode into the first operating mode, e.g. by directing the current through the windings of the coils of the rotor 2a or the stator 2b such that a rotating magnetic field causing a rotational motion of the rotor 2a relative to the stator 2b is generated.

The component parts of the linear actuator 1, in particular the electric motor 2, the transmission mechanism 3 and/or the control unit 4, are arranged inside a housing 10 of the linear actuator 1. The housing preferably comprises a heat conducting material, for example a metal, such that heat generated by the electric motor 2 may be conducted e.g. to the transmission mechanism 3. In order to enhance the heat conductance, the electric motor 2 is preferably arranged such that it is in direct contact with the housing 10.

The transmission mechanism 3 preferably comprises a screw 6, sometimes termed spindle, and a nut 7, wherein an outer thread of the screw 6 meshes with an inner thread of the nut 7. The screw 6 extends parallel to, in particular defines, a longitudinal axis X of the linear actuator 1 or the housing 10, respectively. In the example shown in FIG. 1, the nut 7 is rotationally fixed, e.g. by means of a guide element 8 extending parallel to the longitudinal axis X. Accordingly, by rotating the screw 6, the nut 7 may be translationally moved parallel to the longitudinal axis X.

Rotational motion generated by the electric motor 2 may be transferred to the screw 6 of the transmission mechanism 3 by means of a coupling unit 9. To this end, the coupling unit 9 is preferably arranged in between the transmission mechanism 3 and the electric motor 2. In particular, the transmission mechanism 3, in particular the screw 6 and the nut 7, the coupling unit 9 and the electric motor 2 may be arranged successively, in particular coaxially, along the longitudinal axis X.

Therein, the coupling unit 9 is preferably coupled to, in particular mounted to, the rotor 2a of the electric motor 2. In the example shown in FIG. 1, the electric motor 2 is configured as a brushless outer rotating DC motor, also termed outrunner, wherein the rotor 2a is arranged radially outside of and rotates about the (inner) stator 2b of the electric motor 2. By this means, particular high torque generation and/or transmission may be achieved. However, brushless DC motors having the stator arranged about an (inner) rotor may be utilized in the electric actuator 1 as well.

The coupling of the coupling unit 9 to the transmission mechanism 3, in particular the screw 6, is preferably achieved by an interference fit. The interference fit can be achieved by the screw 6 comprising a conical coupling section, onto which a corresponding conical coupling section of the coupling unit 9 is pressed by screwing the coupling unit 9 onto a proximal end of the screw 6, i.e., an end facing the electric motor 2.

The coupling unit 9 may be rotationally mounted inside the housing 10 by means of a bearing assembly 11. In the present example of FIG. 1, the bearing assembly 11 comprises two ball bearings arranged adjacently. However, different types of bearings are conceivable as well.

The nut 7 is preferably coupled to a push tube 12. The push tube 12 may comprise the form of a hollow cylinder such that the screw 6 can be arranged inside the push tube 12. At a distal end of the push tube 12, i.e., an end facing away from the electric motor 2, the push tube 12 is connected to a clevis 13 for attaching a load to the linear actuator 1.

Thus, by means of translational motion of the nut 7 induced by a rotation of the screw 6, the push tube 12 may be driven such that it at least partially extends from the housing 10. Likewise, upon opposite rotation of the screw 6, the push tube 12 may be at least partially retracted into the housing 10.

Figure 2:
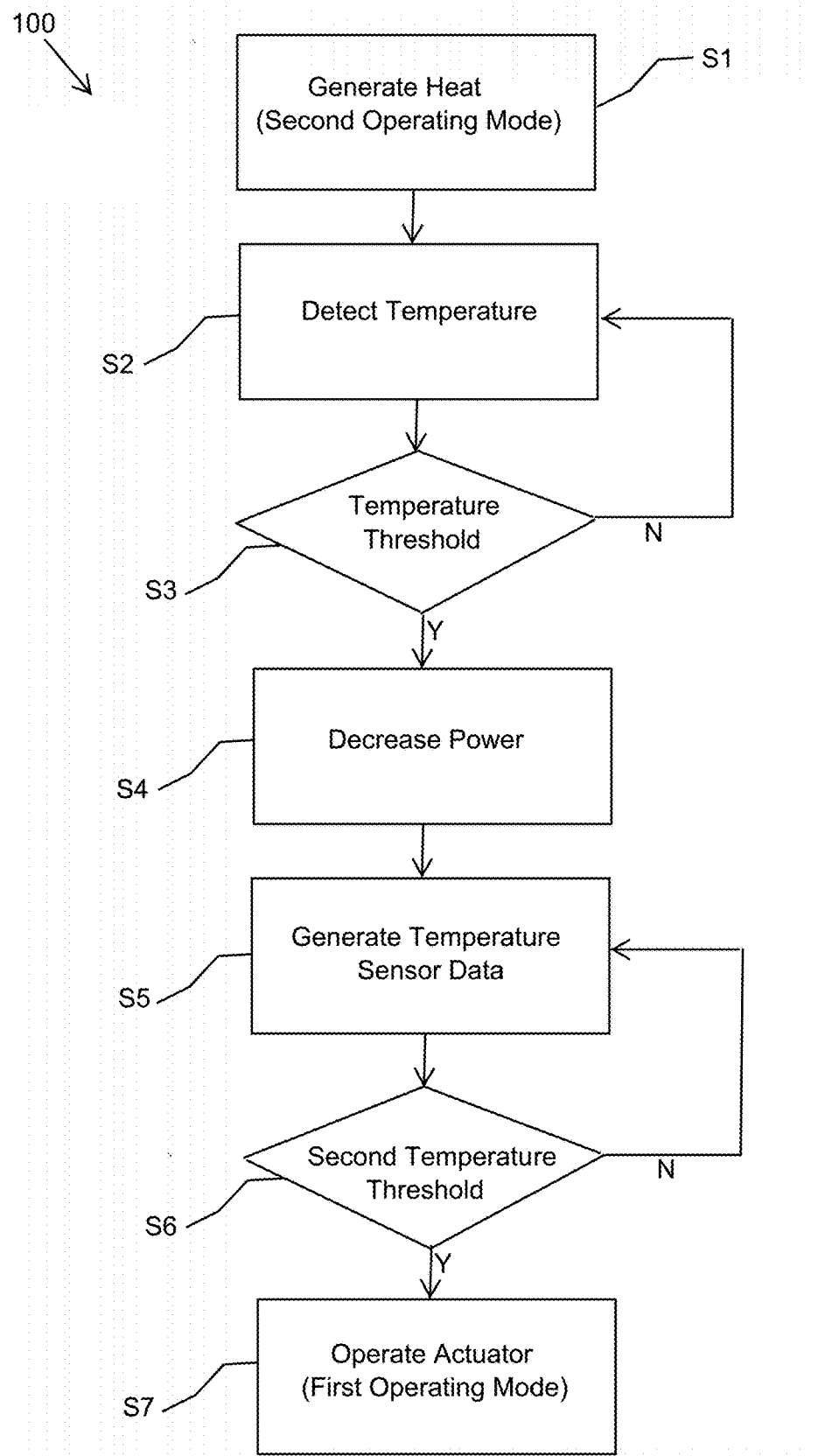
FIG. 2 an example of a method for generating heat in a linear actuator.

Referring now to FIG. 2, there is illustrated a method 100 for heating a linear actuator. The method can be applied, for example, in order to preheat the linear actuator at low temperatures, for example in cold environments. By this means, the temperature of the linear actuator can be brought up to its optimal operation temperature before starting conventional operation.

In a method step S1, the linear actuator is controlled such that it generates heat. To this end, the linear actuator is operated in a second operating mode. The second operating mode is preferably characterised in that an electric motor of the linear actuator does not generate a rotational motion. In other words, in the second operating mode, the linear actuator does preferably not actuate a load coupled to the linear actuator.

In order to generate the heat, the electric motor is preferably powered. However, the power directed to the electric motor is advantageously not used to perform any work.

For example, an electric current may be directed through the windings of at least one electromagnetic coil of a stator or a rotor of the electric motor in such a manner that the rotor does not rotate relative to the stator. This is advantageously achieved by directing a non-transient electric current through the windings, e.g., by applying a constant voltage to the corresponding electromagnetic coil. Due to the resulting magnetic field being constant, no motion of the rotor will be generated.

Therein, the electrical resistance of the windings of the at least one electromagnetic coil thus may consume the power applied to the motor and convert the electric energy corresponding to the electric current into heat.

In order to increase the amount of generated heat in a simple manner, the power applied to the motor, i.e., the electric current directed through the windings of the at least one electromagnetic coil, may be increased. Alternatively or additionally, the electric current may be directed through the windings of a plurality of electromagnetic coils of the stator or the rotor. In particular, the electric current may be directed through the windings of at least a subset, preferably all, of the electromagnetic coils of the stator or the rotor. By this means, rotation of the rotor relative to the stator may be suppressed in a particularly reliable manner, because circumferential magnetic force components arising due to interaction of the magnetic fields generated by a plurality of coils of the stator with magnetic moments of the rotor, or vice versa, may cancel each other.

In a further method step S2, the temperature of the linear actuator may be detected, and corresponding sensor data may be generated. To this end, at least one temperature sensor of the linear actuator may be utilised. The at least one temperature sensor may be, for example, arranged adjacent to the electric motor, in particular in the electrical motor, in order to detect the temperature directly at the heat source.

Based on the sensor data, it may be tested in a further method step S3 whether the temperature of the linear actuator has reached or exceeded a first predetermined temperature threshold. In the negative n, method step S2 may be carried out again, e.g. after a predetermined amount of time has passed. Additionally, the power applied to the electric motor may be further increased in order to accelerate the heating of the linear actuator. This is advantageous in particular if the temperature difference between the detected temperature and the first predetermined temperature threshold is large, in particular larger than a predetermined temperature difference threshold.

In the positive Y, i.e., if the temperature of the linear actuator has reached or exceeded the first predetermined temperature threshold, the power applied to the electric motor may be decreased in a further method step S4. By this means, the heating of the linear actuator can be decelerated, for example in order to prevent the linear actuator from overheating.

In a further method step S5, the temperature of the linear actuator may be detected again, and corresponding sensor data may be generated as well. Based on the sensor data, in a further method step S6, it may be tested whether the temperature of the linear actuator has reached or exceeded the second predetermined temperature threshold. In the negative n, method step S5 may be repeated, e.g. after a predetermined amount of time has passed. Additionally, the power applied to the electric motor may be further decreased in order to decelerate the heating of the linear actuator. This is advantageous in particular if the temperature between the detected temperature and the second predetermined temperature threshold is small, in particular smaller than a predetermined temperature difference threshold.

In the positive Y, i.e., if the temperature of the linear actuator has reached or exceeded the second predetermined temperature threshold, in particular if the temperature has reached or exceeded the optimal operating temperature of the linear actuator, the linear actuator may be switched from the second operating mode to a first operating mode in a further method step S7. In the first operating mode, the electric motor of the linear actuator is preferably operated conventionally, i.e., the electric current is directed through the windings of the electromagnetic coils of the stator or the rotor such that a rotating magnetic field is generated that induces a rotational motion of the rotor relative to the stator. The rotational motion of the rotor may then be transformed into translational motion by means of a transmission mechanism coupled to the electric motor.

The following is a summary list of reference numerals and the corresponding structure used in the above description of the invention:
1 linear actuator
2 electric motor
2a rotor
2b stator
3 transmission mechanism
4 control unit
5 temperature sensor
6 screw
7 nut
8 guide element
9 coupling unit
10 housing
11 bearing assembly
12 push tube
13 clevis
100 method
S1-S7 method steps

The invention claimed is:

1. A linear actuator, comprising:
an electric motor configured to generate rotational motion in a first operating mode of the linear actuator;
a transmission mechanism configured to convert the rotational motion generated by the electric motor into translational motion; and
wherein the linear actuator is configured to generate heat in a second operating mode without the electric motor generating the rotational motion, and to switch from the second operating mode to a first operating mode when a temperature of the linear actuator reaches or exceeds a second predetermined temperature threshold.

2. The linear actuator according to claim 1, wherein said electric motor is configured to generate the heat in the second operating mode.

3. The linear actuator according to claim 1, wherein, in the second operating mode, the linear actuator is configured to generate heat until a temperature of the linear actuator reaches or exceeds a first predetermined temperature threshold.

4. The linear actuator according to claim 3, wherein at least one of the first predetermined temperature threshold or the second predetermined temperature threshold corresponds to a working temperature of the linear actuator.

5. The linear actuator according to claim 1, wherein at least one of the first predetermined temperature threshold or the second predetermined temperature threshold corresponds to a working temperature of the linear actuator.

6. The linear actuator according to claim 1, further comprising a control unit configured to control said electric motor in the second operating mode to cause said electric motor to generate heat.

7. The linear actuator according to claim 6, wherein said control unit is configured to:
determine a voltage of an energy storage unit connected to the linear actuator;
test whether the determined voltage lies within a predetermined voltage range; and
control said electric motor in the second operating mode based on a result of the test.

8. The linear actuator according to claim 1, wherein:
said electric motor comprises a stator and a rotor rotatably mounted relative to said stator; and a control unit is configured to direct an electric current through windings of at least one electromagnetic coil of said stator or said rotor without causing the rotor to rotate relative to the stator in the second operating mode.

9. The linear actuator according to claim 8, wherein the control unit is configured to simultaneously direct the electric current through the windings of a plurality of electromagnetic coils of the stator or the rotor in the second operating mode.

10. The linear actuator according to claim 1, further comprising a housing configured to encase said electric motor and said transmission mechanism, said housing comprising a heat conducting material and being heat-conductively coupled to said electric motor.

11. The linear actuator according to claim 10, wherein said electric motor and said transmission mechanism are successively arranged along a longitudinal axis of the linear actuator.

12. The linear actuator according to claim 1, further comprising at least one temperature sensor configured to detect a temperature of the linear actuator and to generate corresponding sensor data.

13. The linear actuator according to claim 12, configured to generate the heat in the second operating mode based on the sensor data received from said at least one temperature sensor.

14. The linear actuator according to claim 1, wherein said at least one temperature sensor is arranged adjacent said electric motor.

15. A method for heating a linear actuator, the method which comprises:
   in a first operating mode of the linear actuator, generating a rotational motion by electric motor and transforming the rotational motion into a translational motion by way of a transmission mechanism; and
   in a second operating mode, controlling the linear actuator to generate heat without the electric motor generating a rotational motion; and
   switching from the second operating mode to a first operating mode when a temperature of the linear actuator reaches or exceeds a second predetermined temperature threshold.

16. The method according to claim 15, wherein the controlling step comprises causing the electric motor to generate heat without a rotational motion.

17. A method of operating a linear actuator, the method which comprises:
   providing a linear actuator according to claim 1; and
   selectively operating the linear actuator in the first operating mode to heat the linear actuator by energizing the electric motor and generating heat without rotating the electric motor; and
   selectively operating the linear actuator in the second operating mode to generate a rotational motion with the electric motor.

* * * * *